(12) United States Patent
Buwalda et al.

(10) Patent No.: US 6,821,548 B1
(45) Date of Patent: Nov. 23, 2004

(54) SALT-STABLE MODIFIED STARCH

(75) Inventors: Pieter Lykle Buwalda, Groningen (NL); Heine Roelf Meima, Borgercompanie (NL); Charles James Brine, Princeton, NJ (US)

(73) Assignee: Cooperative Verkoop-en Productievereniging van Aardappelmeel en Derivaten AVEBE B.A., Veendam (NL)

( * ) Notice: Subject to any disclaimer, the term of this patent is extended or adjusted under 35 U.S.C. 154(b) by 0 days.

(21) Appl. No.: 09/720,798

(22) PCT Filed: Jul. 2, 1999

(86) PCT No.: PCT/NL99/00416
§ 371 (c)(1),
(2), (4) Date: Mar. 9, 2001

(87) PCT Pub. No.: WO00/01251
PCT Pub. Date: Jan. 13, 2000

(30) Foreign Application Priority Data

Jul. 2, 1998 (EP) .............................. 98202232

(51) Int. Cl.⁷ .......................... A23L 1/0522; A23L 1/31
(52) U.S. Cl. ........................ 426/661; 426/578; 426/574
(58) Field of Search ................. 426/661, 589, 426/578, 574; 127/32, 33, 71

(56) References Cited

U.S. PATENT DOCUMENTS

| | | | |
|---|---|---|---|
| 3,751,410 A | 8/1973 | Caracci et al. | |
| 3,956,515 A | 5/1976 | Moore et al. | |
| 4,109,024 A | * 8/1978 | Cremer | 426/550 |
| 4,228,199 A | 10/1980 | Chiu et al. | |
| 4,612,197 A | 9/1986 | Postner | |
| 4,973,447 A | 11/1990 | Seib et al. | |
| 4,999,205 A | * 3/1991 | Todd, Jr. | 426/250 |
| 5,028,445 A | * 7/1991 | Wu et al. | 426/574 |
| 5,192,576 A | 3/1993 | Chang et al. | |
| 5,232,723 A | 8/1993 | Bisson et al. | |
| 5,858,442 A | * 1/1999 | Payne et al. | 426/574 |
| 6,039,990 A | * 3/2000 | Friedman et al. | 426/129 |
| 6,475,541 B1 | * 11/2002 | Ekhart et al. | 426/94 |
| 6,485,775 B1 | * 11/2002 | Camin et al. | 426/637 |

FOREIGN PATENT DOCUMENTS

| | | |
|---|---|---|
| EP | 0 354 262 A1 | 2/1990 |
| EP | 0 796 868 A2 | 9/1997 |
| JP | 10146173 | 6/1998 |
| WO | WO 97/03573 | 2/1997 |

OTHER PUBLICATIONS

Huchette, M., "La Transformation de L'Amidon pour Usages Industriels et Alimetaries", 7th Congres de l'Association Internationale d'Expertise Chimique (Sep. 15, 1967), pp. 296–306.

Osman, E.M., "Starch in the Food Industry", State University of Iowa (1967), pp. 163–189.

Barker, S.A., "Current and future prospects for starch", The University of Birmingham, Dept. of Chemistry, (1990), pp. 57–62.

De Vries, J.A., Nieuwe mogelijkheden met amylopectine–aardappelzetmeel, *ingrediënten & biotechnologie* (Nov. 2, 1995), pp. 26–27.

* cited by examiner

*Primary Examiner*—Keith Hendricks
(74) *Attorney, Agent, or Firm*—Hoffman & Baron, LLP

(57) ABSTRACT

The invention relates to starch used in the food-industry. The invention provides modified starch, and derivatives derived thereof, having improved salt-stability (salt-stable starch), use of such modified starch or derivatives derived from said starch in foodstuff, a method for providing salt-stability to foodstuff comprising use of such modified starch or derivatives derived from said starch and foodstuff comprising said modified starch or derivatives derived from said starch.

19 Claims, 3 Drawing Sheets

Figure 5:
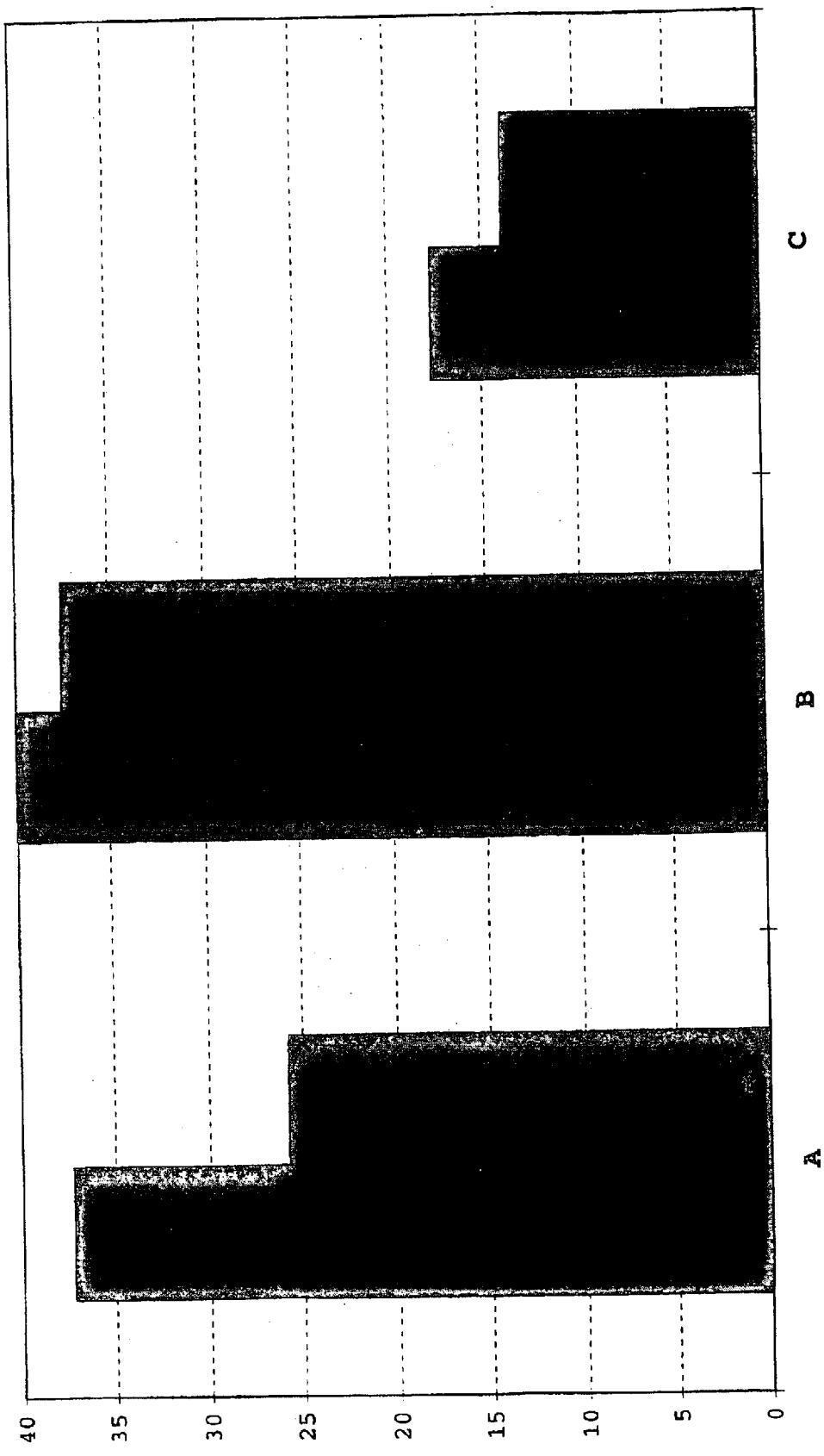

Figure 1: Brookfield viscosity in deionized water
Brookfield LVF., 6 rpm, spindle 4
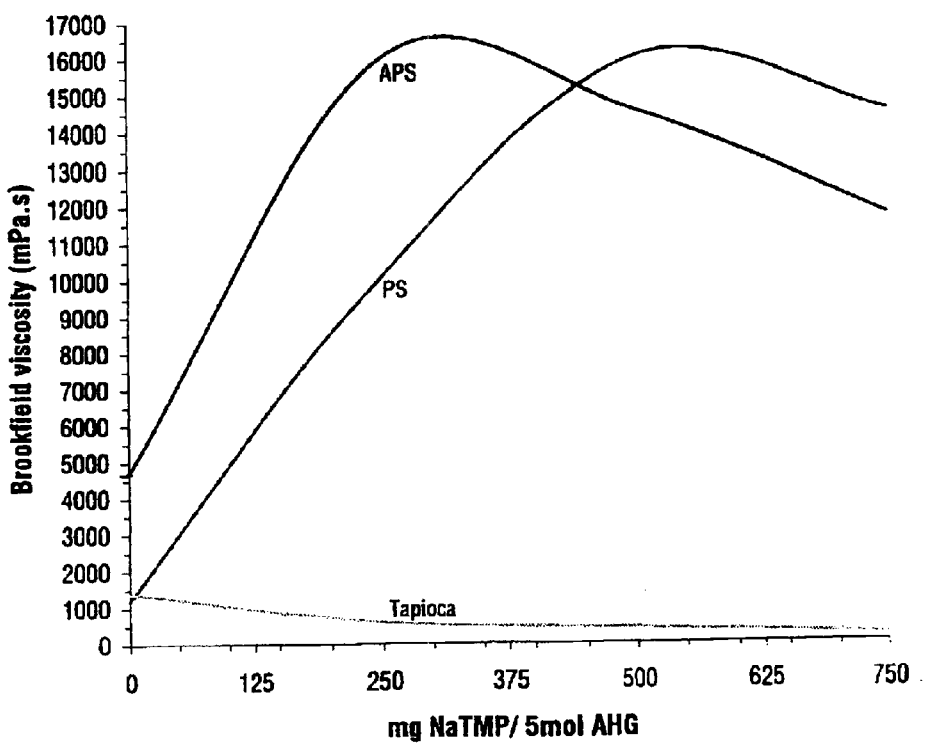
Figure 2: Brookfield viscosity in milk
Brookfield LVF, 6 rpm, spindle 4
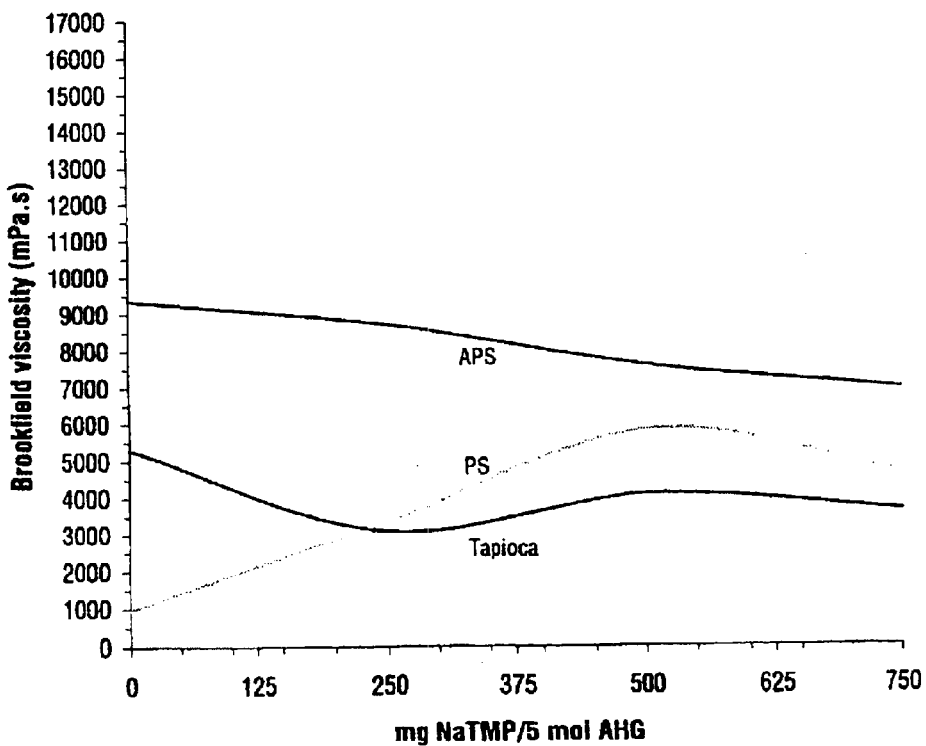

Figure 3 : Brookfield viscosity in 1% CaCl₂
Brookfield LVF, 6 rpm, spindle 4
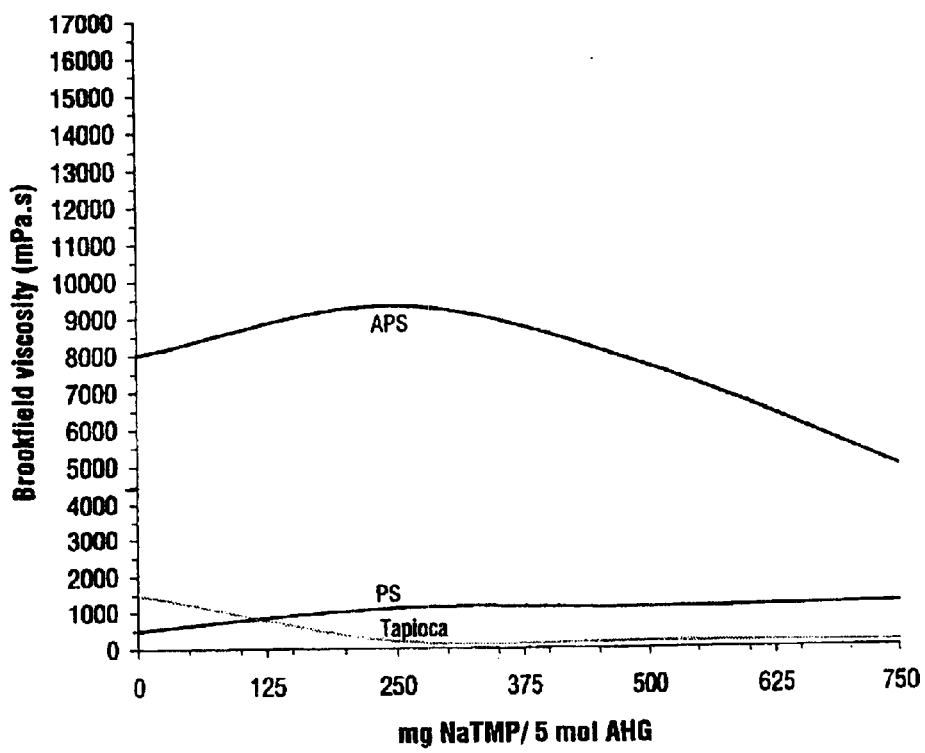
Figure 4 : Brookfield viscosity in 5 % Caseine (Sodium salt)
Brookfield LVF, 6 rpm, spindle 4
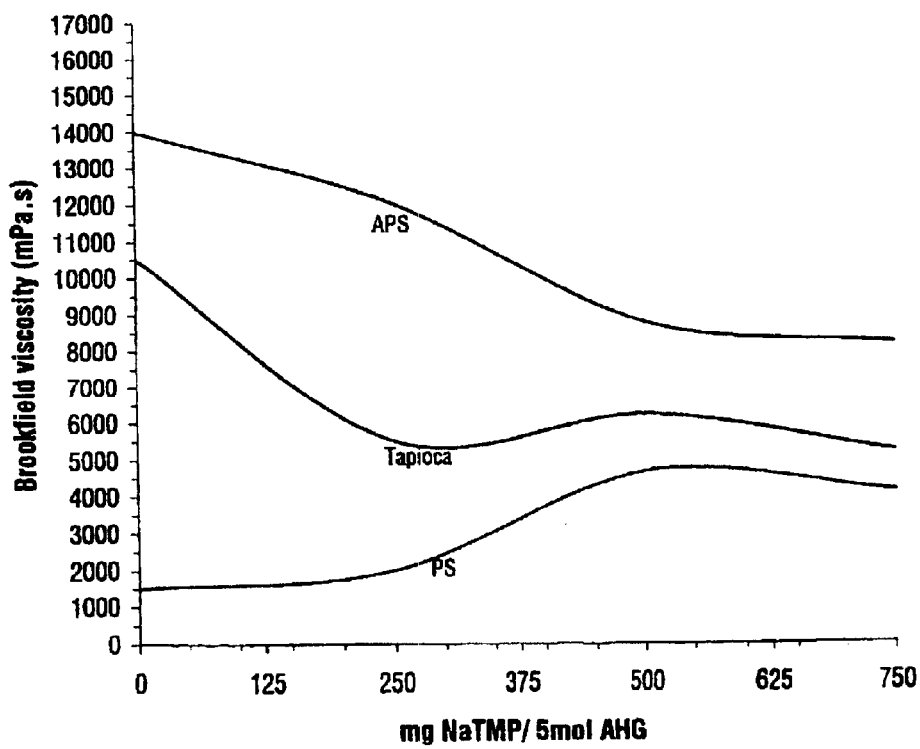

SALT-STABLE MODIFIED STARCH

BACKGROUND OF THE INVENTION

The invention relates to starch used in the food-industry.

Foodstuff is often thickened by the inclusion of a certain amount of starch as binder, filling or thickening agent, for example providing viscosity to a foodstuff during automated filling (canning).

For example, when industrially autoclaving or sterilising a food-stuff containing solid pieces, a certain filling viscosity is required while a container is being filled to prevent splashing of the liquid content over the rim of the container. Also, said viscosity provides an equal distribution of said solids during the filling phase. In canning, after filling, a decrease of viscosity is required, and any residual viscosity of the foodstuff after filling is considered unwanted for many applications. However, viscosity of starches in general is reduced during or after prolonged heat treatment, said reduction is in general aggravated by the presence of salts in the foodstuff.

Yet another reason to thicken a foodstuff is to provide said food with a better flavour, texture (mouthfeel) and appearance (looks).

Starch in itself has some flavour, that in general is appreciated by a customer, provided the foodstuff does not comprise too much starch which makes it taste starchy or cereal-like and provided a sensation of well-cooked starch is present, as opposed to an "undercooked" starch which gives a raw sensation. Most flavour in food, however, derives from (intricate combinations of) salts, proteins, short peptides, amino acids, fatty acids and salts thereof, sugars, short and medium chain alcohols, and so on.

Texture of a starch comprising food is very much dependent on the degree of viscosity attained by adding varying degrees of starch. Aspects such as smoothness, firmness, cohesiveness, density, thickness, wateriness, cutability or spreadability, chewability and others can all depend on the viscosity and water retention properties provided by a starch. Too much cohesiveness is in general not appreciated, customers often prefer a more creamy, smooth texture. The choice of type of starch for use in foodstuff is greatly influenced by properties such as the stability during baking, deep-freezing, thawing and storage. It must furthermore be remembered that in general too much starch, although providing a desired viscosity, may change the flavour of the food negatively, in general there is a need to reduce starch dosage whenever this is made possible.

Appearance of a starch comprising foodstuff relates among others to the aspects mentioned with texture, however, starches often add opacity or cloudiness to food, making it look less palatable.

The above illustrates that, within the food industry, use of starch, for each and every different application, often comprises finding the right balance between too little and too much, in trying to find a product with attractive palatability.

A distinct problem herein is the fact that starches in themselves have reduced stability to the effects of certain salts, ions or electrolytes present in food. For example, a starch may initially provide a desired texture (such as smoothness, firmness, cohesiveness, density, thickness, wateriness, curability or spreadability, chewability) to a foodstuff, which than, however, looses said texture, cohesiveness or smoothness in time because the salt-stability of the starch used is too low or inappropriate. The product becomes watery, falls apart and separates into wet and less wet fractions, leaks flavours, in general looses its appearance and texture, and looses its attraction to a customer. Said loss of texture or appearance is in general caused by a too low stability to salts, electrolytes, cations or anions, or other constituents of food, and necessitates increasing the starch dosage, often with detrimental effects on taste.

The effects of salts on starch have been investigated for more than a century (see for examples: Starch: Chemistry and Technology. Eds. Whistler and Paschall, Academic Press, New York and London).

The gelatinization of starch and starch derivatives in the presence of medium to high concentrations of electrolytes has been studied extensively (B. J. Oosten, Die Staerke 31, 228–230 (1979); B. J. Oosten, Die Staerke 32, 272–275 (1980); B. J. Oosten, Die Staerke 34, 233–239 (1982); B. J. Oosten, Die Staerke 35, 160–169 (1983); B. J. Oosten, Die Staerke 42, 327–330 (1990)). In low concentration systems the properties of solutions of polymers in the presence of electrolytes can be adequately accounted for by electrostatics, taking into account only the magnitude of the ionic charge, the concentration and the solvent. Biological systems are usually more concentrated and specific ion-solvent effects will dominate the solution properties Some electrolytes promote gelatinization and some electrolytes inhibit the process. Promotion or inhibition mainly follow the well known Hofmeister or lyotropic series (F. Franks in "Water", Royal Society of Chemistry Paperbacks London 1983). This series are a listing of the order in which they affect polymer (and therefor starch) solubility. An example of such a series is:

$$CNS^->ClO_4^->I^->NO_3^->Cl^->F^->HPO_3^{2-}>SO_4^{2-},$$

Electrolytes on the left (CNS—, $ClO_4$—, I—, $NO_2$—) promote and on the right ($Cl^-$, $F^-$, $HPO_3^{2-}$, $SO_4^{2-}$) inhibit gelatinisation.

This series can of course be extended with other anions and similar series can be listed for cations, although in general the effects observed for cations are smaller than for anions. A completely satisfying explanation for the observed phenomena for this series has not been reported so far, but the general believe is that electrolytes on the right side enhance water structure thus favouring solvent—solvent interactions over starch-solvent interactions (Franks 1983). This induces a hampered gelatinisation and lack of stability of starches in water.

Neutral components, such as hydrocolloids, ureum, sorbitol, caseine, and sugars such as sucrose, fructose, galactose, and others have similar effects on the stability of starch as salts. It has for example been found that neutral components like saccharides (sugars) effect the viscosity of strach and derivatives (I. D. Evans, D. R. Haisman, Die Staerke 34, 224–231 (1982)). The effects have been contributed to the same phenomena as seen with salts, notably the effects reported on water structure are similar.

The application of starch derivatives in food systems is usually accompanied by the addition of electrolytes, mainly chlorides and phosphates. Especially chlorides and phosphates inhibit the development or stability of viscosity of starch and starch derivatives.

A special case is the addition of calcium ions to potato starch and potato starch derivatives. Potato starch contains bound monophosphate ester groups. In water these phosphate groups give the starch backbone negative charge resulting in a high viscosity as compared to other starches. When calcium ions are added they form a relatively insoluble complex with the phosphate groups resulting in a sharp decrease in viscosity.

Thus, although salt-instability of starch is relatively well understood, the problem remains, starches currently used in the food-industry generally have low-stability to salts compromising at least the palatibility, texture, appearance and other related aspects of foodstuffs.

SUMMARY OF THE INVENTION

The invention provides modified starch, and derivatives derived thereof, having improved salt-stability (salt-stable starch), use of such modified starch or derivatives derived from said starch in foodstuff, a method for providing salt-stability to foodstuff comprising use of such modified starch or derivatives derived from said starch and foodstuff comprising said modified starch or derivatives derived from said starch.

The invention provides a method for improving a foodstuff comprising adding to said foodstuff a salt-stable starch. Such a starch has improved stability to salts and other components that are detrimental to the stability of a common starch. The invention for example provides a method for improving the texture of a foodstuff, e.g. the cohesiveness of relatively solid foods such as meats or meat products or puddings or the smoothness of relatively liquid products such as soups, sauces, creams or fillings. The invention provides a method wherein said salt-stable starch is a non-cereal starch, for example derived from tubers or roots containing essentially only mylopectin molecules.

DETAILED DESCRITPION OF THE INVENTION

The invention provided a method for providing a foodstuff with a desired texture comprising adding to said foodstuff a modified starch obtained from for example tubers or roots, said starch containing essentially only amylopectin inolecules. A modified starch is a native starch treated in such a way as to modify one or more of its physical or chemical properties. Modified starches have remained their starch character. The native or raw starches are modified to produce starch products with desirable properties. Starches, both of the common variety containing both amylose and amylopectin, obtained from both cereals and tubers or roots and of the waxy variety, containing essentially only amylopectin molecules (e.g. 0–5% amylose), obtained from cereals, are widely used in foodstuff.

Common starch consists of two major components, an, in essence, linear α(1–4)D-glucan polymer (branching is found at a low level) and an elaborately branched α(1–4 and 1–6)D-glucan polymer, called amylose and amylopectin, respectively. Amylose has, in solution, a helical conformation with a molecular weight of $10^4$–$10^5$. Amylopectin consists of short chains of α-D-glucopyranose units primarily linked by (1–4) bonds with (1–6) branches and with a molecular weight of up to $10^7$.

Amylose/amylopectin ratios in native starches in plants are generally anywhere at 10–40 amylose/90–60% amylopectin, also depending on the variety of plant studied. In a number of plant species mutants are known which deviate significantly from the above mentioned percentages. These mutants have long been known in maize (corn) and some other cereals. Waxy corn or waxy maize has been studied since the beginning of this century. Therefore, the term waxy starch has often been equated with amylose free starch, despite the fact that such starch was in general not known from other starch sources such as potato but mainly derived from corn. Furthermore, industrial use of an amylose free potato starch has never occurred on a large scale and with such a wide range of applications as waxy starch. The invention provides a method according to the invention wherein said starch has superior salt-stability over a common starch. For example, the invention provides a modified cross-linked starch having superior stability over a common starch when tested in a sodium chloride solution, or when tested in a solution containing calcium ions, which seriously effect the viscosity of a common potato starch. Furthermore, the invention provides a cross-linked starch which has superior salt-stability, even at low viscosity, and it's use is thus not dependent on high-viscosity conditions as for example utilised in EP 0796868. Another example of the invention is a modified starch according to the invention which provides a meat brine, a foodstuff used in preparing meat products, with increased and more stable water binding properties than a common starch would do. Also, the addition of a milk protein, such as caseine which has viscosity inhibiting properties, or derivative thereof to a foodstuff no longer compromises the texture of said foodstuff when a modified starch according to the invention is added to said foodstuff.

The invention provides a method wherein said modified starch containing essentially only amylopectine molecules has been derived from a genetically modified plant. Amylose production in a plant is among others regulated by the enzyme granule-bound starch synthase (GBSS), which is involved in generating the amylose content of starch, and it has been found that many of the waxy cereal mutants described above lack this enzyme or its activity, thereby causing the exclusive amylopectin character of these mutants.

An example of a salt-stable starch provided by the invention is a starch obtained from an amylose-free potato plant which is for example lacking GBSS activity or GBSS protein altogether, thereby lacking amylose and having essentially only amylopectin molecules.

In a preferred embodiment of the invention, a method is provided wherein the starch is derived from a genetically modified plant such as a potato, yam, manihot or cassaye. Genetic modification of such tuber or root plants is a skill available to the artisan, and for example involves modification, deletion of or insertion in or (antisense) reversion of (parts of) a gene, such as a gene encoding granule-bound starch synthase (GBSS), which is involved in determining the amylose content of starch. In order to manipulate such crop plants, efficient transformation systems and isolated genes are available, especially of potato, and others are found by analogy. Traits, such as absence of amylose, that are introduced in one variety of a crop plant can easily be introduced into another variety by cross-breeding.

In the experimental part of this description, a method is provided wherein said modified starch is obtained from a genetically modified potato.

In a preferred embodiment, a method and a modified starch are provided wherein said starch is a cross-linked starch. Crosslinking starch is in itself a method available to the artisan, various cross-linking agents are known, examples are epichlorohydrin, sodium trimetaphosphate, phosphorous oxychloride, chloroacetic acid, acrolein, dichloro acetic acid, adipic anhydride or other reagents with two or more anhydride, halogen, halohydrin, epoxide or glycidyl groups or combinations thereof which all can be used as crosslinking agents. A typical example of such a cross-linked starch is starch mono-phosphate.

Furthermore, the invention provides a starch which is stabilised. Stabilisation by hydroxyalkylation or carboxymethylation of starch is for example obtained with reagents containing a halogen, halohydrin, epoxide or glycidyl group as reactive site. Chloro acetic acid (or its salt) is used as carboxymethylation reagent. In one embodiment of the invention said starch is stabilised by hydroxypropylation, hydroxybutylation, hydroxyethylation and/or carboxymethylation.

In yet another embodiment of the invention, said starch is a stabilized starch in which some or all of the available hydroxyl groups of the amylopectin molecules have been esterified by acetyl groups. The addition of acetyl groups is generally done in aquous suspensions of starch using acetic anhydride or vinyl acetate as reactants under alkaline conditions.

A modified starch as provided by the invention is preferably derived from root or tuber-derived amylose-free or amylopectin native starches such as obtainable from potato starch, tapioca, sweetroot starch, yam starch, canna starch or manihot starch. In a preferred embodiment of the invention such a root or tuber starch is derived from a genetically modified plant, for example from a genetically modified potato plant variety. Examples of such a potato plant variety are the variety Apriori or Apropect, or varieties derived thereof.

In a much preferred embodiment, the invention provides modified starch comprising a starch obtained from tubers or roots, said starch containing essentially only amylopectin molecules, and derivatives derived thereof, having improved salt-stability (salt-stable starch), use of such modified starch or derivatives derived from said starch in foodstuff, a method for providing salt-stability to foodstuff comprising use of such modified starch or derivatives derived from said starch and foodstuff comprising said modified starch or derivatives derived from said starch.

Use of starch from genetically engineered crops has in general been suggested from the time on it was possible to genetically modify such crops (see i.e. Bruinenberg et al., Chemistry and Industry, 6 Nov. 1995, page 881–884; de Vries, Foodmarketing and Technology, April 1997, page 12–13)). Specific use of amylopectin-type potato starch as filling or viscosity agent in canning has been suggested in WO/97/03573 to prevent undesired residual viscosity seen with commonly used starch. Furthermore, EP 0 796 868 suggests use of a hydroxypropylated and highly cross-linked waxy potato starch to increase the viscosity of a food product. However, none of these provide indications on how to avoid using starches in the food-industry which generally have low-stability to salts and compromise at least the palatibility, texture, appearance and other related aspects of foodstuffs. To the contrary, for example WO/97/03573 suggests an amylopectin-type potato starch which maintains its viscosity only for a certain period, after which no residual viscosity is left, suggesting that these types of products are less stable instead, and EP 0 796 868 suggests using said hydroxypropylated and highly cross-linked waxy potato starch under conditions of high temperature, low temperature and high shear, again conditions, such as aseptic filing, retorting or freezing, where fill viscosity may be needed and salt stability is no issue.

In a preferred embodiment, the invention provides a method according to the invention wherein said modified starch is an instant starch. In general starch and starch derivatives for the food industry are insoluble in cold water. Viscosity and water binding is achieved by heating or cooking. These starches are referred to as cook-up starches. For convenience starches are sometimes pregelatinised i.e. precooked and dried. These starches are referred to as instant starches and perform without heating or cooking in the food stuff. Pre-gelatinisation can be achieved by spray cooking, spray drying, roll drying, drum drying, extrusion, heating in aqueous water miscible organic solvents or under high pressure or with other methods known in the art.

Furthermore, the invention provides a method wherein said foodstuff comprises at least 0.5 (w/w)%, preferably at least 0.5 or 1(w/w)% or even at least 2–10(w/w)% of a sodium salt or combinations of sodium salts, for example wherein said salt comprises sodium chloride or for example wherein said salt comprises sodium-mono-glutamate (vetsin).

Also, the invention provides a method wherein said foodstuff comprises at least 0.5 (w/w)%, preferably at least 1 or 2(w/w)% or even at least 10–20(w/w)% of a milk protein or derivative thereof for example wherein said protein is caseine.

Furthermore, the invention provides a method wherein said foodstuff comprises at least 0.5(w/w)%, preferably at least 1 (w/w)% or even at least 3–5(w/w)% of a calcium salt, for example wherein said salt is calcium chloride.

Furthermore, the invention provides a method wherein said foodstuff comprises at least 5(w/w)%, preferably at least 10(w/w)%, more preferably at least 20(w/w)% or even at least 30–70(w/w)% of a sugar, for example wherein said sugar is sucrose.

In the experimental part of this description examples are given of improved foodstuffs according to the invention, wherein various salts, and other components, such as milk protein or sugars, or combinations thereof, are used at various concentrations in combination with a starch according to the invention which provides the desired texture to said foodstuff.

Yet another embodiment of the invention is a method wherein said foodstuff is a meat brine, which is a foodstuff in itself (however in general not intended for primary consumption) and used for example for preparing a meat product. Such a meat brine is in general used to improve the texture of a meat product.

The invention further provides a modified starch for use in a method according to the invention. Examples of such a modified starch are described herein above and in the experimental part of the invention.

Furthermore, the invention provides foodstuff obtainable by a method according to the invention. For example, the invention provides a meat brine comprising a modified starch as provided by the invention.

The invention is further described in the experimental part of the description without limiting the invention thereto.

Experimental part

Example 1

Stability of cross-bonded or cross-linked, acetylated regular potato starch (PS), is influenced negatively when applied in salt containing formulations foodstuffs, however, the invention provides products based on amylopectin potato starch (APS) which are more viscosity or water retention stable than regular potato starch derivatives. Especially products that have been developed for meat or meat product applications, such as meat injection brine, used for example for preparing or injecting meats such as ham or poultry products, such as "thanksgiving" turkey. Possible products are regular potato starch derivatives for example crosslinked with sodiumtrimetaphosphate and acetylated with acetic anhydride and are herein compared with amylopectin potato starch (APS) derivatives. APS was crossbonded with the same amount of NaTMP as PS and stabilized with acetic anhydride. The products were characterised on Brabender gelatinisation in demineralised water (as is) and in 1% NaCl solution.

Materials
- A—Regular potato starch derivative
- B—Amylopectin potato starch derivative
- C—Regular potato starch derivative
- D—Amylopectin potato starch derivative The crosslinking of A, B, C and D with NaTMP and esterification with acetic anhydride were done according to routine procedures.

E—Regular potato starch derivative

F—Amylopectin potato starch derivative

The crosslinking of E and F with $POCl_3$ was done according to routine procedures.

The products were characterised by Brabender gelatinization. Gelatinisation was measured of a 3% (dry matter) suspension with a Brabender viscograph, type E at 250 cmg in demineralized water. Gelatinisation behaviour was also measured in a 1% NaCl solution.

TABLE 1

Brabender gelatinisation, as is and in 1% NaCl solution, Brabender type E, 250 cmg, 75 rpm, 3% (dry matter).

| Product | Starch | Brabender suspension | Tg °C. | Tpeak °C. | BUpeak | Brabender BU at °C. | | | |
|---|---|---|---|---|---|---|---|---|---|
| | | | | | | 75° | 00'90° | 10'90° | 20'90° |
| A | PS | as is | 59.5 | — | — | 795 | 1405 | 1825 | 1915 |
| B | APS | as is | 60.5 | 73.0 | 3110 | 2800 | 2730 | 2520 | 2410 |
| A | PS | 1% NaCl | 61.5 | — | — | 35 | 110 | 155 | 175 |
| B | APS | 1% NaCl | 62.0 | — | — | 940 | 1010 | 1080 | 1095 |
| C | PS | as is | 59.5 | — | — | 805 | 1335 | 1710 | 1800 |
| D | APS | as is | 64.5 | — | — | 1515 | 1735 | 1805 | 1820 |
| C | PS | 1% NaCl | 61.0 | — | — | 65 | 145 | 200 | 220 |
| D | APS | 1% NaCl | 66.0 | — | — | 125 | 365 | 1065 | 1290 |

PS = Potato starch, APS = Amlopectin potato starch

Viscosity levels in demineralised water of the regular potato starch based products do not differ much. Also it becomes clear that Product D based on APS has the same end viscosity as its potato starch counterpart, but the temperature of gelatinisation is much higher. The product B based on APS has still a peak viscosity. From the table it can be noticed that the APS based products are more salt stable than the regular PS based products. The end viscosity levels of the samples prepared with potato starch and the APS counterparts do not differ upon gelatinisation in demineralised water. Product B and D. based on amylopectin potato starch provide better stability in the salt solution than the samples prepared with regular potato starch and can therefor be used at lower concentrations.

In table 2, similar effects of POCl cross-linked starch ethers are shown.

TABLE 2

Brookfield viscosity of the products E and F as is and in 1% NaCl solution Broookfield: RVDV II+ #5, 50 rpm

| Product | Starch | Crossl. | Amount per kg | Subst. | DS | Solution | Viscosity mPas |
|---|---|---|---|---|---|---|---|
| E | PS | $POCl_3$ | 19.5 µL | HP | 0.15 | as is | 6150 |
| F | APS | $POCl_3$ | 19.5 µL | HP | 0.15 | as is | 4400 |
| E | PS | $POCl_3$ | 19.5 µL | HP | 0.15 | 1% NaCl | 1960 |
| F | APS | $POCl_3$ | 19.5 µL | HP | 0.15 | 1% NaCl | 2450 |

Reduction in viscosity of regular potato starch derivative: 70%

Reduction in viscosity of Amylopectin potato starch: 40%

Viscosity of regular starch derivative in water (as is) is higher than APS derivative. In salt solution the reverse is observed.

Example 2

Viscosity measurement of cross-linked instant starch derivatives in deionized water, 5%(w/w) sodium casein solution and 1% (w/w) $CaCl_2$ solution Weight 10 gram of the product. Add 212 ml of the desired solution while the mixture is stirred by hand. Then the mixture is stirred for 1 minute using a Ultra-Turrax at a speed of 4000 rpm. After 29 minutes the dispersion is again stirred by hand for M minute and then the viscosity is measured using a Brookfield LVF at 6 rpm with spindle no. 4. Viscosity is determined for increasing degree of cross-linking. For results compare, FIGS. 1, 3, 4.

Example 3

Viscosity measurement of instant starch derivatives in the presence of milk powder.

Weigh 10 gram product and 28 gram milk powder. Add 212 ml deionised water while the mixture is stirred by hand. Then the mixture is stirred for 1 minute using a Ultra-Turrax at a speed of 4000 rpm. After 29 minutes the dispersion is again stirred by hand for ½ minute and then the viscosity is measured using a Brookfield LVF at 6 rpm with spindle no. 4. Viscosity is determined for increasing degree of cross-linking. For results compare, FIGS. 1, 2.

Example 4

Water binding

Meat injection brines are injected into whole muscle meats. They provide a desired texture to the meat by dissolving meat proteins that coagulate upon heating. Starch is used to bind water in order to increase the pump level, (the amount of water incorporated in the meat product) and texture of the product. They also play a preserving role because of the salt content of the brine. In these experiments water is used to replace meat, in order to get a realistic approximation of the content of the different ingredients. The ingredients of the meat injection brine are as follows:

| | |
|---|---|
| demineralised water | 480 g |
| salt | 8 g |
| starch | 5.5 g |
| dextrose | 4 g |
| sodium phosphate | 2.5 g |

The water binding capacity of the brine is measured as follows. The ingredients are mixed and put in a Brabender viskograph. The initial temperature of the Brabender is set on 30° C., the mixture is heated till 75° C. with a slope of 1.5° C./min. After staying 5 min at 75° C., the temperature decreases till 25° with a slope of 3° C./min. The mixture is removed from the Brabender and 400 ml is transferred into 2 transparent centrifuge tubes and centrifuged for 15 min at 894 g and 25° C. The separation line between the pellet and the sediment and the supernatant is marked and hereafter the tubes are emptied and dried. Then the tubes are filled with water till the mark; the weight of the water is the sediment volume. The water binding capacity can be expressed in ml sediment per g starch.

At least two repeats of each starch sample are done. The standard deviation is 5 ml sediment/500 ml on average, which is reasonable compared to a mean of 78 ml sediment/500 ml.

In FIG. 5 the water binding of three cross-bonded hydroxypropylated derivatives is shown. The water binding is expressed in ml per g of starch. Farinex Va. 15 is a product based on regular potato starch, HW 3294 is a product based amylopectin potato starch and B 990 is a product based on maize starch. The grey bars on the left are the water binding capacities in demineralised water, the black bars on the right are the capacities in brine. As can be seen from the figure, in demineralised water the binding capacity of the products based on potato starch and amylopectin potato starch are about the same. The water binding capacity of the product based on maize starch is much lower.

In brine the binding capacity of the amylopectin based derivative is essentially the same as in water. Only a drop of less than 9% in the binding capacity is observed. The potato based (30%) and the corn based products (23%) show a much larger drop in water binding capacity.

Example 6

Viscosity measurements of starch derivatives in the presence of sugar.

It has been found that neutral components like saccharides (sugars) affect the viscosity of starch and derivatives (I,D. Evans, D. R. Haisman, Die staerke 34, 224–231 (1982)). The effects have been contributed to the same phenomena as with salts (water structure).

Example 6 provides the effects on viscosity of using APS derived starch in sugar solutions.

Addition of relatively large amounts of sucrose to common starch causes a decrease in viscosity. Quite surprisingly, amylopectin potato starch derivatives show the opposite effect, as is demonstrated in table 3.

TABLE 3

| | | Brab. | | | | Brabender BU at ° C. | | |
|---|---|---|---|---|---|---|---|---|
| Product | Starch | susp. | TG | Tpeak | Bupeak | 75° | 00'90° | 20'90° |
| A | PS | as is | 59.5 | — | — | 795 | 1405 | 1915 |
| B | APS | as is | 0.5 | 73.0 | 3110 | 2800 | 2730 | 2410 |

TABLE 3-continued

| Product | Starch | Brab. susp. | TG | Tpeak | Bupeak | Brabender BU at ° C. 75° | 00'90° | 20'90° |
|---|---|---|---|---|---|---|---|---|
| A | PS | 30% sucr. | 61.5 | — | | 360 | 920 | 1320 |
| B | APS | 30% sucr. | 63.0 | 73 | 4960 | 4800 | 3920 | 3520 |

Example 7

Moisture loss of sausages upon refrigerated storage Bologna sausages were stored in refrigeration at minus 5.5 degrees Centigrade for a week. The sausages were weighed before and after storage, from this the moisture loss was calculated.

In the recipe for the sausage 4 types of starch were used:

Farinex VA15 a crosslinked, acytelated potato starch (sodium trimetaphosphate, acetic acid anhydride)

Amylo VA15 a crosslinked, acytelated amylopectin potato starch (sodium trimetaphosphate, acetic acid anhydride)

Perfectabind M10 a crosslinked, hydroxypropylated potato starch ($POC_{13}$, propylene oxyde)

Amylo M10 a crosslinked, hydroxypropylated amylopectin potato starch ($POC_{13}$ Propylene oxyde)

| Recipe of the Bologna sausage: | |
|---|---|
| Lean beef | 44.7% |
| Fat beef | 11.2% |
| Water | 34.4% |
| Salt | 2.0% |
| Sodium tripolyphosphate | 0.3% |
| Sugar | 1.7% |
| Milwalkee seasoning S79608 | 2.3% |
| Nitrite (150 ppm) | 0.14% |
| Starch | 3.3% |

Preperation of the Bologna sausage:

The beef was ground and mixed with water, the ingredients except the starch were added and mixed again, starch was added, mixed again untill a homogeneous mass was obtained.

This was emulsified and putt into Bologna sausage casings.

Subsequently the sausages were smoked in a smokehouse.

TABLE 4

Moisture loss of Bologna sausages after refrigeration for 1 week

| Type of starch | moisture loss* |
|---|---|
| Farinex VA15 | 2.0% |
| Amylo VA15 | 1.5% |
| Perfectabind M10 | 3.8% |
| Amylo M10 | 1.8% |

*These figures are averages of 6 individual sausages per type of starch.

Examples of improved foodstuff according to the invention.

| Instant fruit filling | | |
|---|---|---|
| Ingredients: | % | g |
| Instant modified starch | 33.3 | 15.0 |
| Powdered sugar | 66.7 | 30.0 |

Preparation procedure:
- the dry ingredients are blended
- the powdered mix (45 g) is added to 200 ml fruit juice and stirred (low speed) for 1 minute.

| Instant lemon whipped dessert | |
|---|---|
| Ingredients: | % |
| Powdered sugar | 32.0 |
| Instant skimmed milk powder | 22.2 |
| Whippable Fat Powder | 22.0 |
| Starch derivative | 22.0 |
| Lemon Flavour | 1.0 |
| Citric acid | 0.5 |
| Colour | 0.3 |

Use 50 g dry mix to 150 mL of cold water

| Fat-free bologna Recipe for fat-free bologna | |
|---|---|
| Ingredients: | % |
| Lean port (1.2%–1.5% fat) | 28.55 |
| Lean turkey (0.7% fat) | 24.37 |
| Water | 27.30 |
| Modified starch | 7.62 |
| Dextrose | 3.13 |
| Salt | 2.12 |
| Milk protein hydrolysate | 2.06 |
| Bologna flavouring/seasoning | 1.79 |
| Sodium lactate | 1.25 |
| Turkey stock (dry) | 0.38 |
| Sodium tripolyphosphate | 0.25 |
| Cure-all (6.25% of $NaNO_2$) | 0.12 |

| Low-fat hot dogs | |
|---|---|
| Ingredients: | % |
| B90 Lean Beef | 39.17 |
| B65 Fat Beef | 9.36 |
| Water | 1.27 |
| Salt | 2.05 |
| Sodium Tripolyphosphate (TSP) | 0.243 |
| Sucrose | 1.69 |

-continued

Low-fat hot dogs

| Ingredients: | % |
|---|---|
| Beef Frankfurter Seasoning | 2.20 |
| Cure salt (contains 6.25% sodium nitrite) | 0.121 |
| Sodium Erythorbate | 0.022 |
| Ground Mustard | 0.58 |
| Modified starch | 3.38 |
| Total raw meat mix: | 100.0 |

Vending soup

| Ingredients: | % | g |
|---|---|---|
| Instant modified starch | 2.6 | 5.5 |
| Bouillon powder | 1.9 | 4.0 |
| Water | 95.5 | 200.0 |

Preparation procedure:
- weight the dry components in a 250 ml beaker
- add hot water and stir

Instant pudding

| Ingredients: | % | g |
|---|---|---|
| Instant modified starch | 24.2 | 20.0 |
| Powdered sugar | 48.5 | 40.0 |
| Dextrose monohydrate | 24.2 | 20.0 |
| Tetrasodium pyrophosphate | 2.0 | 1.8 |
| Calcium acetate | 1.0 | 0.8 |
| Colour/vanilla flavour | 0.1 | 0.4 |

Preparation procedure:
- the dry ingredients are blended
- the powdered mix (80 g) is added to 500 ml cold milk and stirred for 1 minute using an electric hand-mixer (high speed)
- pour the pudding into dessert-trays and place them into the refrigerator for 30 minutes

Bilberry pie filling

| Ingredients: | % | g |
|---|---|---|
| A | | |
| sugar | 19.0 | 47.5 |
| modified starch | 5.4 | 13.5 |
| salt | 0.2 | 0.5 |
| B | | |
| bilberry juice | 30.0 | 75.0 |
| water | 45.4 | 113.5 |
| Total: | 100.0 | 250.0 |

Preparation procedure:
- mix the dry components (mix A)
- mix bilberry juice and water in a pan (mix B)
- add mix A to mix B and suspend with a whisk
- heat until boiling whilst stirring with a wisk
- keep boiling for 1 minute

UHT lobster soup

| Ingredients: | % |
|---|---|
| Milk | 12.1 |
| Cream | 6.0 |
| Lobstermix** | 5.1 |
| Lecimulthin 100* | 0.02 |
| Instant modified starch | 4.3 |
| Water | 72.48 |

*Supplier Lucas Meyer
**Supplier Rieber & Son

Processing steps for lobster soup:

Preheating to 70° C. in a PHE

Homgenisation at 50 bar

Sterilisation at 135° C.

Holding for 28 seconds

Cooling to 20° C. in tubes (20 QC heb ik veranderd in ° C.)

Filling temperature 20° C.

Recipe UHT spicy soup

| Ingredients: | % |
|---|---|
| Salt (NaCl) | 0.8 |
| Butter | 0.6 |
| Tomato paste | 12.5 |
| Instant modified starch | 2.0 |
| Spice mix | 0.8 |
| Chicken bouillon | 0.2 |
| Lecimulthin 100* | 0.03 |
| Water | 83.07 |

*Supplier Lucas Meyer

Processing steps for tomato soup:

Preheating to 70° C. in a PHE

Homgenisation at 50 bar

Sterilisation at 135° C.

Holding for 28 seconds

Cooling to 20° C. in tubes

Filling temperature 20° C.

Instant bakery cream

| Ingredients: | % | g |
|---|---|---|
| Instant modified starch | 20.0 | 80.0 |
| Whole milk powder | 30.0 | 120.0 |
| Powdered sugar | 47.5 | 130.0 |
| Alginate blend | 2.25 | 20.0 |
| Colour/vanilla flavour | 0.25 | 1.0 |

Preparation procedure:
- the dry ingredients are blended
- the powdered mix (400 g) is added to 1000 ml tap water and stirred for 3 minutes using an Hobart mixer (high speed)

| Meal formulation for 50 Lbs | |
| --- | --- |
| Ingredients | % |
| B85 Lean Beef | 44.740% |
| B50 Fat Beef | 11.180% |
| Water | 34.380% |
| Salt | 2.030% |
| Sodium Tripolyphosphate | 0.280% |
| Sucrose | 1.692% |
| Seasoning Milwaukee* | 2.280% |
| Nitrite (150 PPM) | 0.140% |
| Sod Erythorbate (550 PPM of | 0.000% |
| Starch | 3.288% |
| Total | 99.997% |

FIGURES

FIG. 1. Viscosity measurement of cross-linked instant starch derivatives in deionized water.

FIG. 2. Viscosity measurement of cross-linked instant starch derivatives in a milky solution, here prepared by adding milk powder.

FIG. 3. Viscosity measurement of cross-linked instant starch derivatives in 1%(w/w) $CaCl_2$ solution.

FIG. 4. Viscosity measurement of cross-linked instant starch derivatives in 5%(w/w) sodium casein solution.

FIG. 5. Water binding properties of cross-linked hydroxylpropylated starch derivatives in water and in brine.

What is claimed is:

1. A meat or meat product comprising a meat brine, wherein said meat brine comprises a salt stable starch, and wherein said starch is a non-cereal starch comprising at least 95% of amylopectin.

2. A meat or meat product according to claim 1, wherein said meat or meat product comprises at least 0.1 (w/w)% of a sodium salt.

3. A meat or meat product according to claim 1, wherein said meat or meat product comprises at least 0.5 (w/w)% of a sodium salt.

4. A meat or meat product according to claim 1, wherein said meat or meat product comprises at least 1 (w/w)% of a sodium salt.

5. A meat or meat product according to claim 4, wherein said salt is sodium chloride.

6. A meat or meat product according to claim 1, wherein said meat or meat product comprises at least 0.5 (w/w)% of a milk protein or derivative thereof.

7. A meat or meat product according to claim 1, wherein said meat or meat product comprises at least 1 (w/w)% of a milk protein or derivative thereof.

8. A meat or meat product according to claim 1, wherein said meat or meat product comprises at least 0.5 (w/w)% of a calcium salt.

9. A meat or meat product according to claim 1, wherein said meat or meat product comprises preferably at least 1 (w/w)% of a calcium salt.

10. A method for preparing a meat or a meat product, said method comprising injecting into the meat or meat product a meat brine comprising a salt stable starch, wherein said starch is a non-cereal starch comprising at least 95% of amylopectin.

11. A method for retaining water in a meat or a meat product, said method comprising injecting into the meat or meat product a meat brine comprising a salt stable starch, wherein said starch is a non-cereal starch comprising at least 95% of amylopectin.

12. A meat or meat product comprising a meat brine, wherein said meat brine comprises a salt stable starch, and wherein said starch is a non-cereal starch comprising at least 95% of amylopectin, and wherein said meat or meat product comprises at least 1 (w/w)% of a calcium chloride.

13. A meat or meat product according to claim 12, wherein said meat or meat product comprises at least 5 (w/w)% of a sugar.

14. A meat or meat product according to claim 12, wherein said meat or meat product comprises at least 10 (w/w)% of a sugar.

15. A meat or meat product according to claim 12, wherein said meat or meat product comprises at least 20 (w/w)% of a sugar.

16. A meat or meat product according to claim 13, wherein said sugar is sucrose.

17. A meat brine comprising a salt stable starch, wherein said starch is a non-cereal starch comprising at least 95% of amylopection and wherein said starch is an instant starch.

18. A meat or meat product comprising a meat brine, wherein said meat brine comprises a salt stable starch, wherein said starch is a non-cereal starch comprising at least 95% of amylopectin, and wherein said meat or meat product comprises at least 1 (w/w)% of a monosodium glutamate.

19. A meat or meat product comprising a meat brine, wherein said meat brine comprises a salt stable starch, wherein said starch is a non-cereal starch comprising at least 95% of amylopectin, and wherein said meat or meat product comprises at least 1 (w/w)% of caseine.

* * * * *

UNITED STATES PATENT AND TRADEMARK OFFICE
CERTIFICATE OF CORRECTION

PATENT NO. : 6,821,548 B1
DATED : November 23, 2004
INVENTOR(S) : Buwalda et al.

It is certified that error appears in the above-identified patent and that said Letters Patent is hereby corrected as shown below:

<u>Title page,</u>
Item [74], *Attorney, Agent, or Firm*, now reads "Hoffman & Baron, LLP", and should read -- Hoffmann & Baron LLP --

<u>Column 2,</u>
Line 2, now reads "curability...", and should read -- cutability... --
Line 35, now reads "Hofineister...", and should read -- Hofmeister... --
Line 43, now reads "C10$_4$-..." and should read -- C10$_4^-$... --

<u>Column 3,</u>
Line 50, now reads "inolecules." and should read -- molecules. --

<u>Column 4,</u>
Line 60, now reads " cassaye." and should read -- cassavé. --

<u>Column 6,</u>
Line 38, now reads "0.5(w/w)%,..." and should read -- 0.1(w/w)%,... --

<u>Column 8,</u>
Line 50, now reads "POCl…" and should read -- POCl$_3$... --

<u>Column 9,</u>
Line 15, now reads "for m minute..." and should read -- for ½ minute... --

<u>Column 13,</u>
Line 25, now reads "weight..." and should read -- weigh... --

UNITED STATES PATENT AND TRADEMARK OFFICE
CERTIFICATE OF CORRECTION

PATENT NO. : 6,821,548 B1
DATED : November 23, 2004
INVENTOR(S) : Buwalda et al.

It is certified that error appears in the above-identified patent and that said Letters Patent is hereby corrected as shown below:

<u>Column 15,</u>
Line 1, now reads " " and should read -- <u>Hot dogs and Bologna</u>
<u>(low fat formulation 15%)</u> --

Signed and Sealed this

Twenty-sixth Day of April, 2005

JON W. DUDAS
*Director of the United States Patent and Trademark Office*